(12) United States Patent
Veronesi et al.

(10) Patent No.: US 9,225,389 B2
(45) Date of Patent: Dec. 29, 2015

(54) ELECTRICAL LOAD MONITORING APPARATUSES

(71) Applicants: William A. Veronesi, Hartford, CT (US); Nicholas Charles Soldner, Southbury, CT (US); Lawrence E. Zeidner, West Hartford, CT (US)

(72) Inventors: William A. Veronesi, Hartford, CT (US); Nicholas Charles Soldner, Southbury, CT (US); Lawrence E. Zeidner, West Hartford, CT (US)

(73) Assignee: CARRIER CORPORATION, Farmington, CT (US)

( * ) Notice: Subject to any disclaimer, the term of this patent is extended or adjusted under 35 U.S.C. 154(b) by 643 days.

(21) Appl. No.: 13/624,306

(22) Filed: Sep. 21, 2012

(65) Prior Publication Data

US 2013/0257169 A1    Oct. 3, 2013

Related U.S. Application Data

(60) Provisional application No. 61/538,266, filed on Sep. 23, 2011.

(51) Int. Cl.
*H04B 5/00* (2006.01)

(52) U.S. Cl.
CPC ............ *H04B 5/0037* (2013.01); *H04B 5/0031* (2013.01); *H04B 5/0075* (2013.01)

(58) Field of Classification Search
CPC .. H04B 5/0037; H04B 5/0031; H04B 5/0076; H04B 5/0075
USPC .......................................................... 307/104
See application file for complete search history.

(56) References Cited

U.S. PATENT DOCUMENTS

| | | |
|---|---|---|
| 4,858,141 A | 8/1989 | Hart et al. |
| 7,069,161 B2 | 6/2006 | Gristina et al. |
| 7,089,089 B2 | 8/2006 | Cumming et al. |
| 7,412,338 B2 | 8/2008 | Wynans et al. |
| 7,668,671 B1 | 2/2010 | Gristina |
| 7,804,262 B2 | 9/2010 | Schuster et al. |
| 8,664,937 B2 | 3/2014 | Fisera |
| 2003/0135338 A1 | 7/2003 | Knaus et al. |
| 2006/0241880 A1 | 10/2006 | Forth et al. |
| 2006/0271244 A1 | 11/2006 | Cumming et al. |
| 2008/0058997 A1 | 3/2008 | Timblin |
| 2009/0009175 A1 | 1/2009 | Semati |
| 2010/0305889 A1 | 12/2010 | Tomlinson, Jr. et al. |
| 2011/0004421 A1 | 1/2011 | Rosewell et al. |
| 2011/0025519 A1 | 2/2011 | Donaldson et al. |
| 2011/0066299 A1 | 3/2011 | Gray et al. |

FOREIGN PATENT DOCUMENTS

JP    2003284160 A    10/2003

OTHER PUBLICATIONS

Non Final Office Action for U.S. Appl. No. 13/624,247, mailed Sep. 17, 2014, 9 pages.

*Primary Examiner* — Hal Kaplan
(74) *Attorney, Agent, or Firm* — Cantor Colburn LLP

(57) ABSTRACT

An electrical load monitoring apparatus includes a first inductive coupling device, the first inductive coupling device is configured to receive electrical energy associated with an electrical conductor proximate thereto, and a processor in electrical communication with the first inductive coupling device, wherein the processor is configured to receive the electrical energy from the first inductive coupling device, configured to modulate a carrier wave signal in response to the received electrical energy, and configured to inject the modulated carrier wave signal into the electrical conductor.

16 Claims, 8 Drawing Sheets

ELECTRICAL LOAD MONITORING APPARATUSES

CROSS-REFERENCE TO RELATED APPLICATIONS

This application is a non-provisional patent application which claims the benefit of U.S. provisional patent application 61/538,266 filed Sep. 23, 2011, the entire contents of which are incorporated herein by reference.

BACKGROUND OF THE INVENTION

Conventionally, an electrical distribution system may include a plurality of different loads which, cumulatively, present a load to an external power grid. It may be desirable to monitor in real-time, or at regular intervals, the amount of load presented. For example, FIG. 1 depicts an electrical distribution system 100. The system includes an electrical load monitor 101. The monitor 101 may monitor a cumulative load through detection of voltage and current at meter interface 102. This cumulative load is presented to electrical power grid 103. The cumulative load is created by electrical loads 1-N, which are fed power through breaker panel 104. It should be appreciated that as loads 1-3 are presented at the single meter interface 102, the monitor 101 can only accurately measure the cumulative load versus any individual contributions from loads 1-3. However, as load N is serviced through meter 106 and individual load monitor 105, the individual contribution from load N may be readily determined. This information may be beneficial as to identifying energy saving or diagnostic opportunities associated with the load N. However, as there are no individual load monitoring devices integrated with loads 1-3, many energy saving opportunities may be lost. Furthermore, given the extra componentry (e.g., 105 and 106) necessary to monitor individual loads, costs associated with load monitoring may be prohibitive and may negate any potential energy savings.

BRIEF DESCRIPTION OF THE INVENTION

According to an example embodiment of the present invention, a non-intrusive electrical load monitoring apparatus includes a first inductive coupling device, the first inductive coupling device is configured to receive electrical energy associated with an electrical conductor proximate thereto, and a processor in electrical communication with the first inductive coupling device, wherein the processor is configured to receive the electrical energy from the first inductive coupling device, configured to modulate a carrier wave signal in response to the received electrical energy, and configured to inject the modulated carrier wave signal into the electrical conductor.

BRIEF DESCRIPTION OF THE DRAWINGS

The subject matter which is regarded as the invention is particularly identified and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Non-Intrusive Load Monitoring (NILM) is an approach to overcome the limitations of conventional systems which are based on providing separate power monitoring equipment for individual loads. NILM involves the observation of power-use signatures for a set of individual components and inferring the contribution of individual components to future energy use time profiles when many loads may be present. The effectiveness of NILM may be limited in practice by an essential lack of sufficient information to separate out the contributions of similar loads and by the need to carefully commission such a system by operating loads in isolation to gather signature data.

Figure 1:
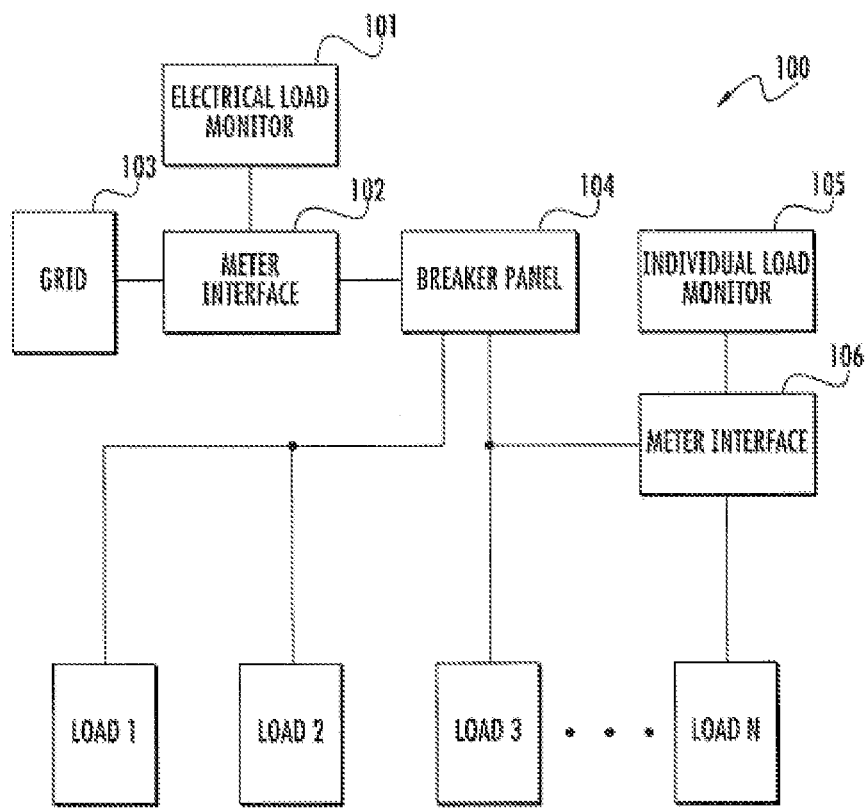
FIG. 1 depicts an electrical system.
Figure 2:
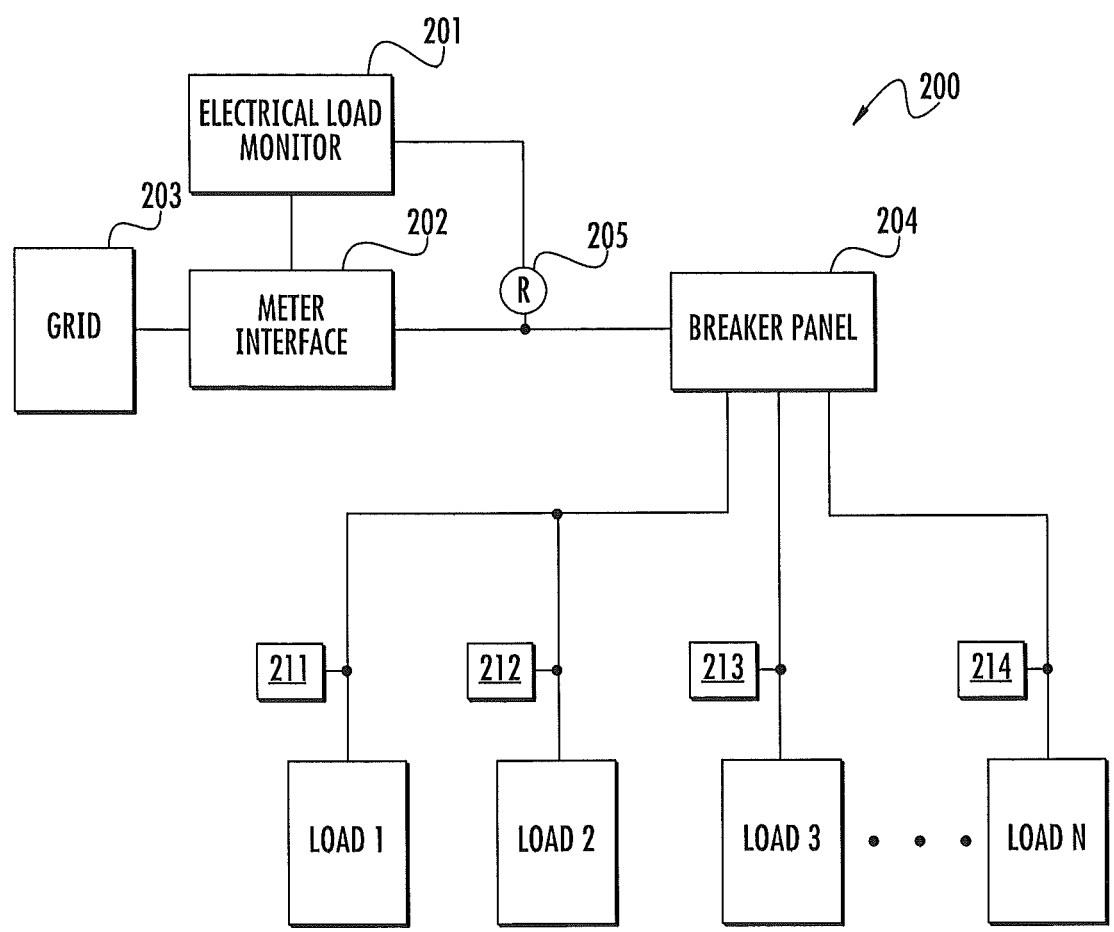
FIG. 2 depicts an electrical system with electrical load monitoring, according to an example embodiment.

Therefore, the practical effectiveness of NILM can be greatly improved by the addition of devices at one or more loads that can indicate a state of each load. The state reported can be on-off or a quantitative measure related to power, current, voltage, etc. For example, FIG. 2 depicts an electrical system with NILM, according to an example embodiment.

The system 200 includes an electrical load monitor 201. The monitor 201 may monitor a cumulative load through detection of voltage and current at meter interface 202. This cumulative load is presented to electrical power grid 203. The cumulative load is created by electrical Loads 1-N, which are fed power through breaker panel 204.

The system 200 further includes load monitoring devices 211-214 arranged proximate an electrical power branch associated with loads 1-N, respectively. For example, monitoring device 211 is proximate an electrical power branch associated with load 1, monitoring device 212 is proximate an electrical power branch associated with load 2, monitoring device 213 is proximate an electrical power branch associated with load 3, and monitoring device 214 is proximate an electrical power branch associated with load N.

Each monitoring device may produce a signal to report back a status of an associated load. The signal is modulated with a carrier signal propagated by means of communication over the power lines between the load monitor 201 and the associated load. For example, the system 200 further includes carrier signal reader or monitor 205. The carrier signal reader or monitor 205 may monitor a main power bus or line within system 200 to determine if the carrier signal exists. The carrier signal may be demodulated to determine each signal representative of each load monitoring device. A device load signal may be arranged as any appropriate representation of the associated load. For example the technology and hardware associated with Radio Frequency Identification Device, RFID, tags could be utilized to achieve the desired modulation and demodulation for communication.

Each device 211-214 includes a current sensing means to detect the presence or absence of a load current flowing to its associated load. According to one example embodiment, each device 211-214 may further include a means to determine a quantitative measure of a load current flowing to its associated load. Each device 211-214 may be powered in a plurality of different manners, including but not limited to, internal batteries, external power sources, inductive power from an associated electrical power branch, or any other suitable means. Further, each device 211-214 may not be directly inter-wired within the electrical system 200, but instead may be arranged to detect and transmit electrical load information through induction. Thus, each device 211-214 may be positioned proximate an associated load line, rather than requiring a direct connection and complicated installation, for example, by attaching each device through use of a clip, loop, fastener, adhesive, or any other suitable attachment means.

According to at least one example embodiment, each device 211-214 includes at least one antenna or inductive pickup coil or inductive coupling device configured to convert flux associated with load current of a respective power branch or a carrier signal into a voltage useable to power the device. Furthermore, in response to receiving said voltage, the device is further configured to modulate an individual address or identification code onto a carrier signal, and inject the carrier signal into the respective power branch through transmission of the modulated signal via the at least one antenna. Therefore, if an associated load is activated (i.e., current begins to flow), the associated device will be powered on by energy associated with the change in flux, modulate a carrier base signal with its identification code, and inject the modulated signal into the associated power line. Upon propagation of the signal to the signal reader or monitor 205, the signal reader or monitor 205 demodulates the carrier signal to extract any enveloped identification codes and provides these codes to the electrical load monitor 201. Therefore, in addition to the cumulative load of the system 200, the electrical load monitor 201 is able to determine the number of active loads in the system 200 and exactly which load(s) are active, (e.g., for load management, security, or other applications).

Therefore, as loads 1-N may be individually monitored through demodulation of a carrier signal propagated through actual power lines, individual contributions from each load may be readily determined through analysis of a cumulative load and identified number of active loads. This information may be beneficial as to identifying energy saving opportunities associated with all of loads 1-N. By providing an independent signal of load transition, on/off data enables better characterization of load transient signatures, as, for example, instances of single load transitions can be clearly identified and associated with corresponding, observed transient waveforms. On state knowledge simplifies the task of characterizing the typical power requirements of individual loads. With direct control of load state through a building control system, characterization can even be automated and algorithms designed to transition individual loads when steady or no-load conditions exist, simplifying the correct association of transient waveforms and typical load draw with corresponding building loads. A building control system can also be used, over a period of time, to methodically create situations in which particular combinations of devices are on, so that their profiles can be accurately characterized, without confounding interpretation of power level signals from devices that may be poorly characterized beforehand.

However, it may also be beneficial to determine a quantitative measure of a load as well as whether a load is active. Thus, according to some example embodiments, each device 211-214 includes at least one antenna or inductive pickup coil configured to convert flux associated with load current of a respective power branch into a voltage useable to power the device. Furthermore, in response to receiving said voltage, the device is configured to determine a measure of the converted voltage. The actual voltage measurement may be facilitated through an analog to digital converter or other voltage sensing means, and the voltage measured may be indicative of an amount of current, and therefore an amount of a load, associated therewith. Furthermore, the device is further configured to modulate an individual address or identification code as well as the load determination onto a carrier signal, and inject said modulated carrier signal into the respective power branch through transmission of the modulated signal via the at least one antenna or inductive pickup. Therefore, if an associated load is activated (i.e., current begins to flow), the associated device will be powered on by energy associated with the change in flux produced by the load current at the inductive pickup, determine an amount of current or load associated therewith, modulate a carrier base signal with its identification code and the measured load information, and inject the modulated signal into the associated power line. Upon propagation of the signal to the signal reader or monitor 205, the signal reader or monitor 205 demodulates the carrier signal to extract any enveloped identification codes and attached load information, and provides this information to the electrical load monitor 201. Therefore, in addition to the cumulative load of the system 200, the electrical load monitor 201 is able to determine the number of active loads in the system 200, exactly which load is active, and a quantitative measure of a load or current associated with the active loads. For example, this may be useful in a plurality of potential applications including, but not limited to, resource management, load balancing, pricing/usage fees, and other suitable applications.

Therefore, as loads 1-N may be individually monitored through demodulation of a carrier signal propagated through actual power lines, individual contributions from each load may be readily determined by analysis of voltage or current information transmitted by each load monitoring device. This information may be beneficial as to identifying energy saving or diagnostic opportunities associated with the all of loads 1-N.

With regards to individually monitoring loads, non-intrusive load monitoring devices may be employed. Hereinafter, a more detailed description of non-intrusive load monitoring devices is given with reference to FIGS. 3-8.

Figure 3:
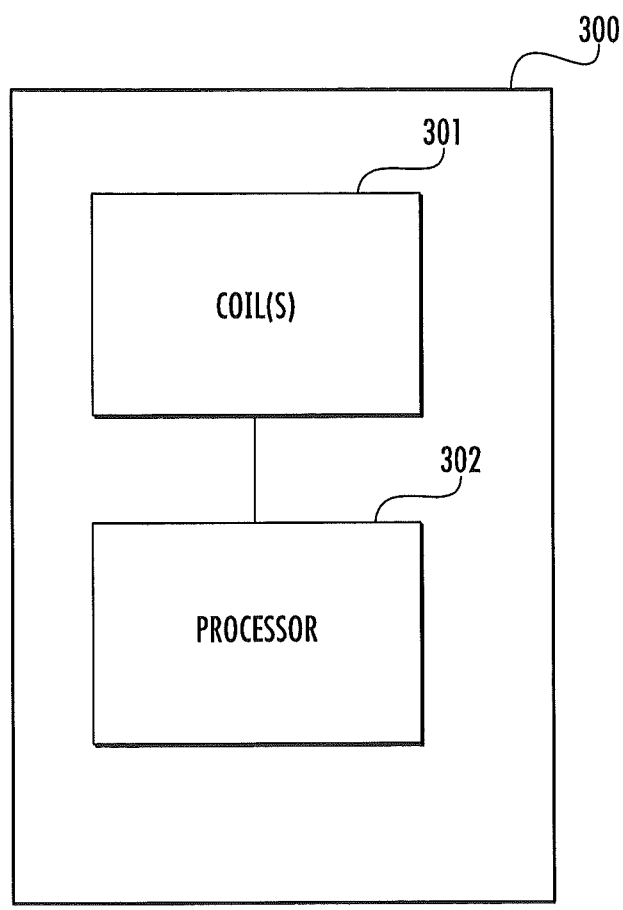
FIG. 3 is a schematic of an electrical load monitoring device, according to an example embodiment.

FIG. 3 is a schematic of a non-intrusive electrical load monitoring device, according to an example embodiment. The device 300 includes one or more inductive coupling devices 301 and a processor 302. The coupling device(s) 301 may be any suitable coil or coils configured to receive energy from electrical conductors proximate thereto, to transfer the energy to the processor 302, to receive a modulated carrier signal from the processor 302, and to inject the modulated carrier signal onto electrical conductors proximate thereto. The processor 302 may be any suitable processor configured to receive energy transferred from the coil(s) 301, to make a determination based upon the transferred energy, to modulate a carrier signal based upon the determination, and to transfer the modulated carrier signal to the coil(s) 301. According to at least one example embodiment, the processor 302 is a radio frequency identification (RFID) processor/transmitter apparatus configured to modulate an associated identification number within the carrier signal. According to another example embodiment, the processor 302 is a RFID processor/transmitter apparatus equipped with a voltage sensing portion or means configured to sense a voltage proportional to a load current of electrical conductors proximate thereto. Thus, the processor 302 may modulate an associated identification number and proportional voltage value within the carrier signal as well. According to additional example embodiments, the processor 302 may be configured to perform a plurality of additional computations and instructions according to any desired implementation.

Figure 4:
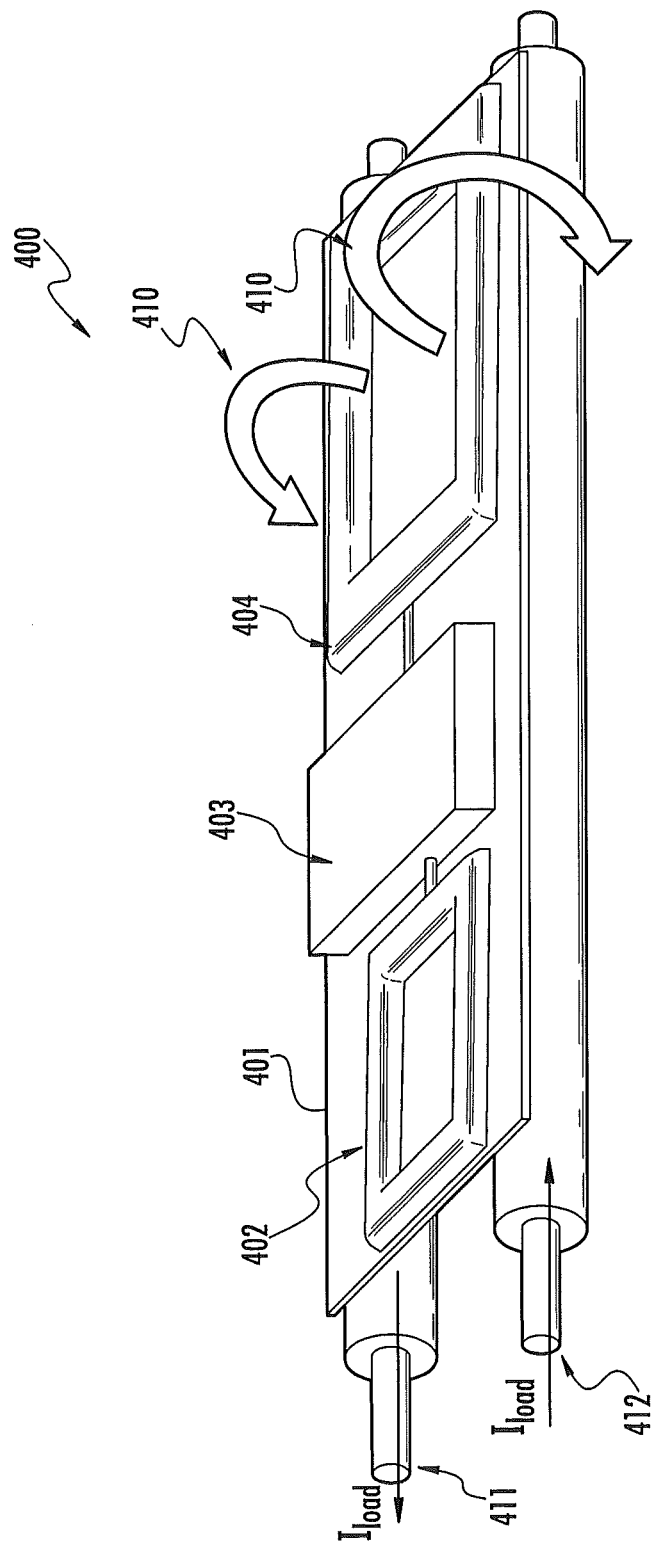
FIG. 4 is a perspective view of an electrical load monitoring device, according to an example embodiment.

FIG. 4 is a perspective view of a non-intrusive electrical load monitoring device, according to an additional example embodiment. According to FIG. 4, the device 400 includes a substrate 401. The device 400 further includes a first inductive coupling device 401 (e.g., an inductive coil or antenna) arranged on the substrate 401. The first inductive coupling device 401 may be any suitable coil as described above. The device 400 further includes processor 403 arranged on the substrate 401 in electrical communication with the first coil 402. The processor 403 may be any suitable processor as described above. The device 400 further includes second coil 404 arranged on the substrate 401 in electrical communication with the processor 403. The second coil 404 may be any suitable coil as described above and, for example, configured to receive electrical energy 410 from electrical conductors 411 and 412 proximate thereto.

Figure 5:
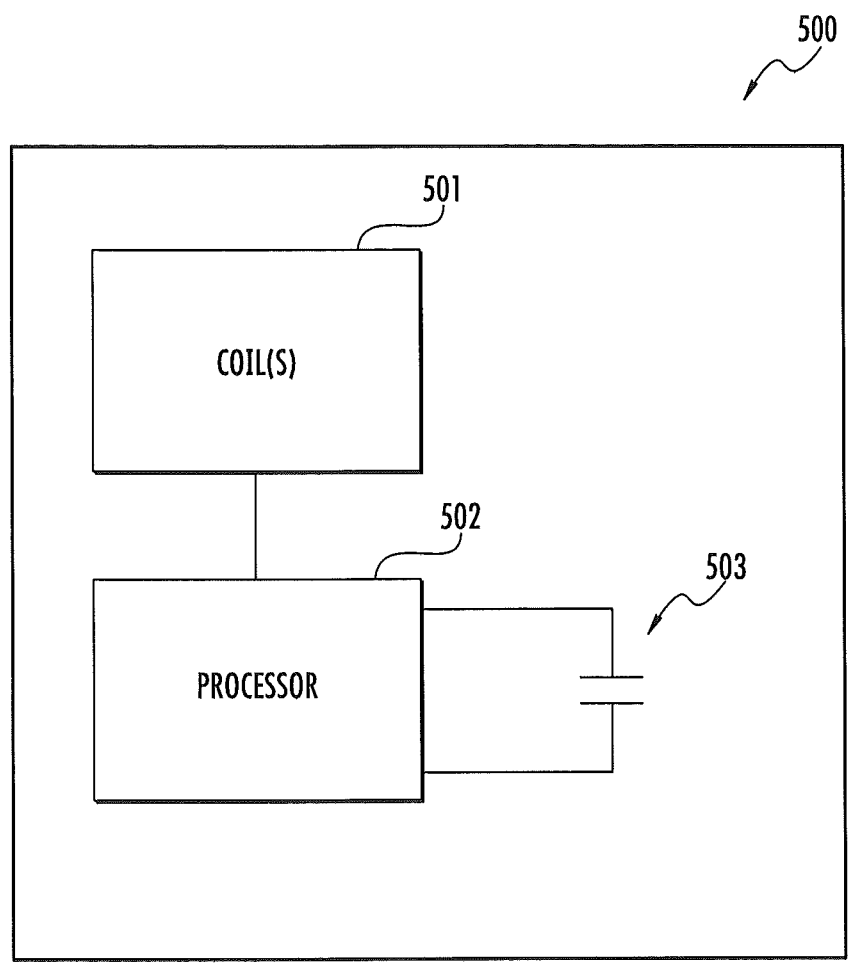
FIG. 5 is a schematic of an electrical load monitoring device, according to an example embodiment.

FIG. 5 is a schematic of a non-intrusive electrical load monitoring device, according to another example embodiment. As illustrated in FIG. 5, the device 500 includes one or more coils 501 and a processor 502. The coil(s) 501 may be any suitable coil or coils configured to receive energy from electrical conductors proximate thereto, to transfer the energy to the processor 502, to receive a modulated carrier signal from the processor 502, and to inject the modulated carrier signal onto electrical conductors proximate thereto. The processor 502 may be any suitable processor configured to receive energy transferred from the coil(s) 501, to make a determination based upon the transferred energy, to modulate a carrier signal based upon the determination, and to transfer the modulated carrier signal to the coil(s) 501. According to at least one example embodiment, the processor 502 is a radio frequency identification (RFID) processor/transmitter apparatus configured to modulate an associated identification number within the carrier signal. According to another example embodiment, the processor 502 is a RFID processor/transmitter apparatus equipped with a voltage sensing means configured to sense a voltage proportional to a load current of electrical conductors proximate thereto. Thus, the processor 502 may modulate an associated identification number and proportional voltage value within the carrier signal as well. According to additional example embodiments, the processor 502 may be configured to perform a plurality of additional computations and instructions according to any desired implementation.

Turning back to FIG. 5, the device 500 further includes inductive switch 503 in communication with the processor 502. The inductive switch 503 is a switch configured to open/close in response to an increase or decrease in electrical energy of electrical conductors proximate thereto. For example, the switch 503 may be a switch configured to open or close in response to a load current flowing proximate thereto. Therefore, the switch 503 may signal to the processor 502 whether a load current is flowing or not. As such, the device 500 may be used for non-intrusive electrical load monitoring.

Figure 6:
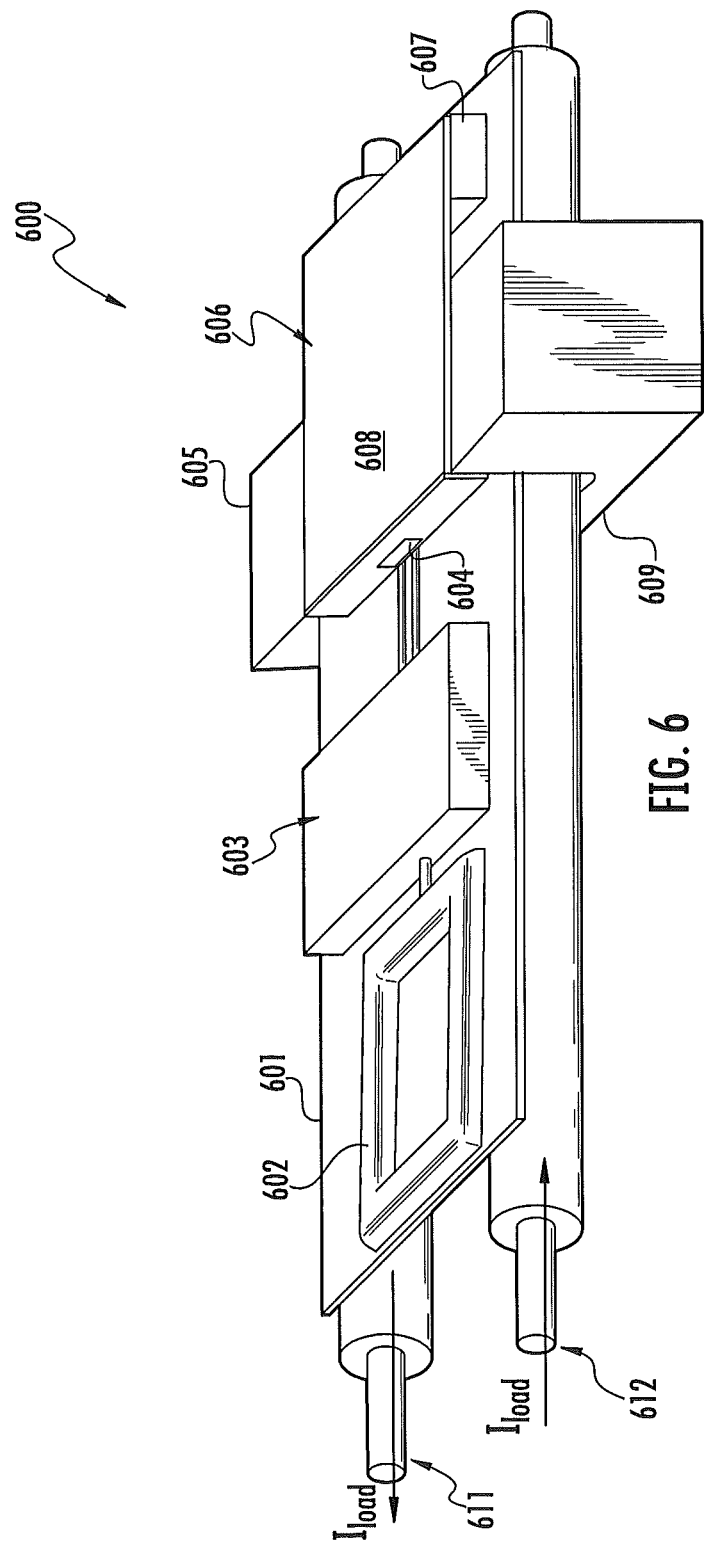
FIG. 6 is a perspective view an electrical load monitoring device, according to an example embodiment.

FIG. 6 is a perspective view a non-intrusive electrical load monitoring device, according to an additional example embodiment. As illustrated, the device 600 includes substrate 601. The device 600 further includes first coil 602 arranged on the substrate 601. The first coil 602 may be any suitable coil as described above. The device 600 further includes processor 603 arranged on the substrate 601 and in electrical communication with the first coil 602. The processor 603 may be any suitable processor as described above. The device 600 further includes inductive switch 605 arranged on the substrate 601 and in electrical communication with the processor 603.

The inductive switch 605 may include electrical contacts 604 disposed in electrical communication with the processor 603 in a somewhat similar arrangement as that depicted in FIG. 5. Turning back to FIG. 6, the inductive switch 605 includes main switch body 609 and mobile switch body 608. The main switch body 609 and the mobile switch body 608 may be formed of a magnetic material and/or a material with a high permeability. The main switch body 609 may be supported on or by the substrate 601 and may be in magnetic communication with the mobile switch body 608.

The mobile switch body 608 may support the electrical contacts 604 such that the electrical contacts 604 make selective contact with electrical traces on the substrate 601. The mobile switch body may be supported on the substrate 601 through a cantilever assembly of cantilever arm 606 and cantilever arm support 607. The cantilever arm 606 may be a flexible material, for example, configured to support the mobile switch body 608 above the substrate 601 when no external forces are applied. Additionally, if external electrical forces are apparent, the cantilever arm 606 is configured to allow the mobile switch body 608 to provide electrical contact at the substrate 601. For example, external electrical forces may include electrical flux associate with a load current flowing through electrical conductors 611 and 612.

Figure 7:
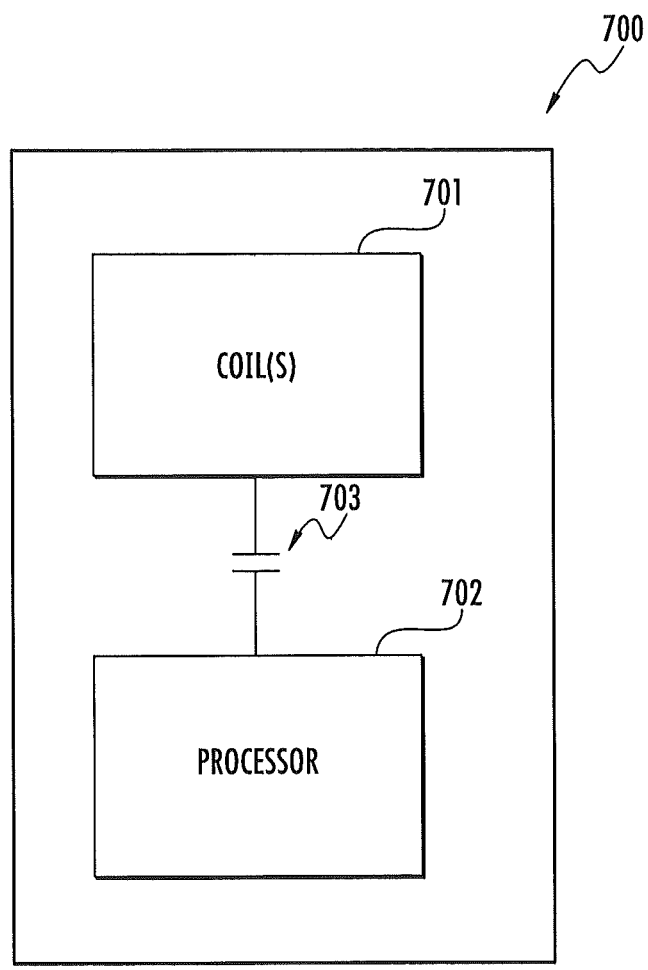
FIG. 7 is a schematic of an electrical load monitoring device, according to an example embodiment.

FIG. 7 is a schematic of a non-intrusive electrical load monitoring device, according to another example embodiment. As illustrated in FIG. 7, the device 700 includes one or more coils 701 and a processor 702. The coil(s) 701 may be any suitable coil or coils configured to receive energy from electrical conductors proximate thereto, to transfer the energy to the processor 702, to receive a modulated carrier signal from the processor 702, and to inject the modulated carrier signal onto electrical conductors proximate thereto. The processor 702 may be any suitable processor configured to receive energy transferred from the coil(s) 701, to make a determination based upon the transferred energy, to modulate a carrier signal based upon the determination, and to transfer the modulated carrier signal to the coil(s) 701. According to at least one example embodiment, the processor 702 is a radio frequency identification (RFID) processor/transmitter apparatus configured to modulate an associated identification number within the carrier signal. According to another example embodiment, the processor 702 is a RFID processor/transmitter apparatus equipped with a voltage sensing means configured to sense a voltage proportional to a load current of electrical conductors proximate thereto. Thus, the processor 702 may modulate an associated identification number and proportional voltage value within the carrier signal as well. According to additional example embodiments, the processor 702 may be configured to perform a plurality of additional computations and instructions according to any desired implementation.

Turning back to FIG. 7, the device 700 further includes inductive switch 703 in communication with the processor 702 and the coil(s) 701. The inductive switch 703 is a switch configured to open/close in response to an increase or decrease in electrical energy of electrical conductors proximate thereto. For example, the switch 703 may be a switch configured to open or close in response to a load current flowing proximate thereto. Therefore, the switch 703 may signal to the processor 702 whether a load current is flowing or not by disconnecting or connecting the coil(s) 701. As such, the device 700 may be used for non-intrusive electrical load monitoring.

Figure 8:
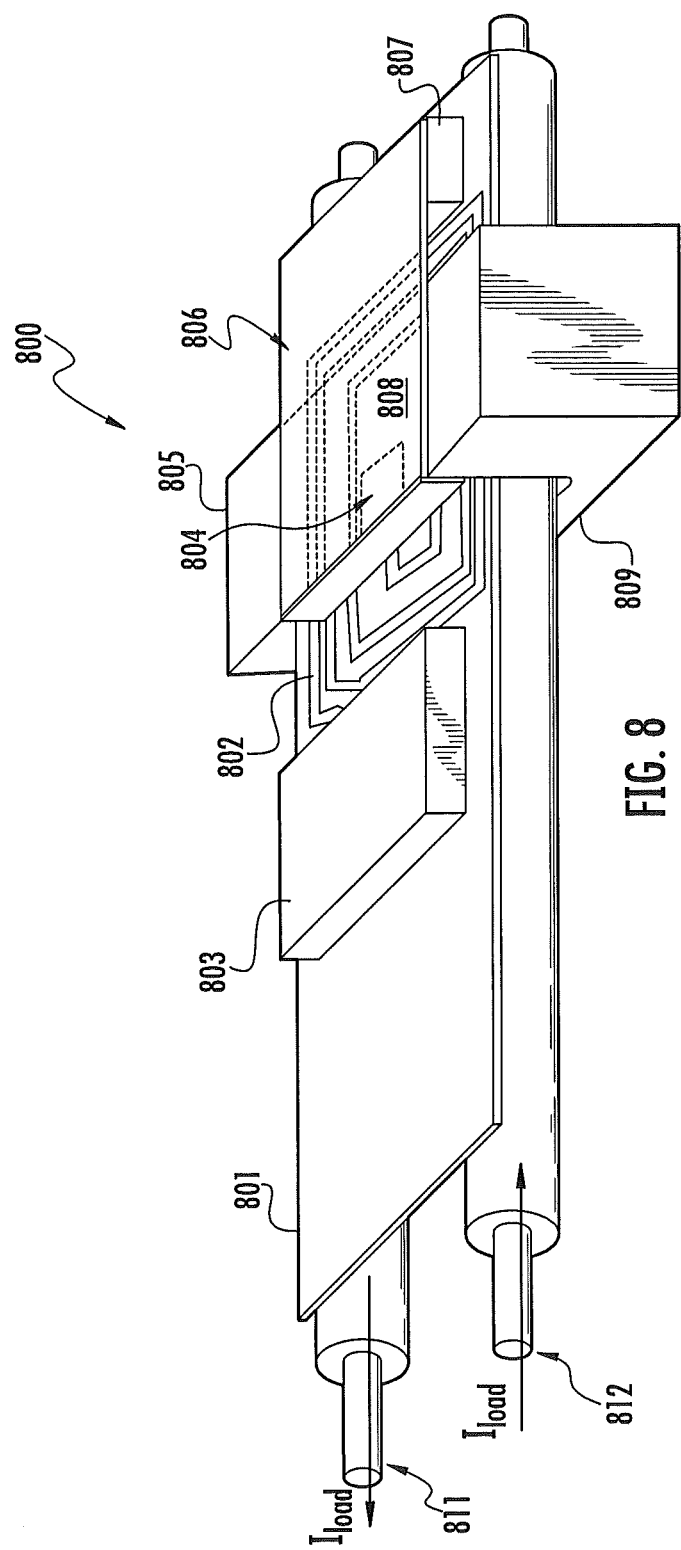
FIG. 8 is a perspective view of an electrical load monitoring device, according to an example embodiment

FIG. 8 is a perspective view of a non-intrusive electrical load monitoring device, according to an additional example embodiment. As illustrated, the device 800 includes substrate 801. The device 800 further includes first coil 802 arranged on the substrate 801 beneath inductive switch 805. The first coil 802 may be any suitable coil as described above. The device 800 further includes processor 803 arranged on the substrate 801 and in electrical communication with the first coil 802. The processor 803 may be any suitable processor as described above. As illustrated, the inductive switch 805 is arranged on the substrate 801 above or enveloping the first coil 801, and in electrical communication with the processor 803.

The inductive switch 805 may include electrical contacts 804 disposed in electrical communication with the first coil 802 in a somewhat similar arrangement as that depicted in FIG. 7, such that the inductive switch 805 selectively activates/deactivates the first coil 802. Turning back to FIG. 8, the inductive switch 805 includes main switch body 809 and mobile switch body 808. The main switch body 809 and the mobile switch body 808 may be formed of a magnetic material and/or a material with a high permeability. The main switch body 809 may be supported on or by the substrate 801.

The mobile switch body 808 may support the electrical contacts 804 such that the electrical contacts 804 make selective contact with electrical traces defining a portion of the first coil 802 on the substrate 801. The mobile switch body 808 may be supported on the substrate 801 through a cantilever assembly of cantilever arm 806 and cantilever arm support 807. The cantilever arm 806 may be a flexible material, for example, configured to support the mobile switch body 808 above the substrate 801 when no external forces are applied. Additionally, if external electrical forces are apparent, the cantilever arm 806 is configured to allow the mobile switch body 808 to provide electrical contact at the substrate 801. For example, external electrical forces may include electrical flux associate with a load current flowing through electrical conductors 811 and 812.

As described above, example embodiments of the present invention provide novel non-intrusive load monitoring techniques and devices which overcome the drawbacks of conventional, intrusive systems. Example embodiments provide electrical load information useful for uniquely determining the power usage of a number of electrical loads connected to a single power metering system through the use of a plurality of individual non-intrusive load monitoring devices.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrical load monitoring apparatus, comprising:
   a first inductive coupling device, the first inductive coupling device configured to receive electrical energy associated with an electrical conductor proximate thereto; and
   a processor in electrical communication with the first inductive coupling device, wherein the processor is configured to receive the electrical energy from the first inductive coupling device, configured to modulate a carrier wave signal in response to the received electrical energy, and configured to direct the first inductive coupling device to inject the modulated carrier wave signal into the electrical conductor.

2. The apparatus of claim 1, further comprising:
   a second inductive coupling device in electrical communication with the processor configured to send and receive data based on electrical energy associated with the electrical conductor.

3. The apparatus of claim 1, further comprising:
   an inductive switch in electrical communication with the processor, the inductive switch configured to selectively open and close in response to an increase or decrease in electrical energy associated with the electrical conductor.

4. The apparatus of claim 3, wherein the inductive switch comprises:
   a set of electrical traces in communication with the processor;
   a set of electrical contacts;
   a mobile switch body configured to position the set of electrical contacts in severable electrical contact with the set of electrical traces in response to the increase or decrease in electrical energy associated with the electrical conductor.

5. The apparatus of claim 4, wherein the inductive switch further comprises a flexible cantilever arm in mechanical communication with the mobile switch body.

6. The apparatus of claim 5, wherein the inductive switch further comprises a main switch body in magnetic communication with the mobile switch body.

7. The apparatus of claim 6, wherein the mobile switch body and the main switch body are formed of a magnetic material.

8. The apparatus of claim 1, further comprising:
   an inductive switch in electrical communication with the first inductive coupling device, the inductive switch configured to selectively activate or deactivate the apparatus in response to an increase or decrease in electrical energy associated with the electrical conductor.

9. The apparatus of claim 8, wherein the inductive switch comprises:
   a set of electrical traces defining a portion of the first inductive coupling device;
   a set of electrical contacts;
   a mobile switch body configured to position the set of electrical contacts in severable electrical contact with the set of electrical traces in response to the increase or decrease in electrical energy associated with the electrical conductor.

10. The apparatus of claim 9, wherein the inductive switch further comprises a flexible cantilever arm in mechanical communication with the mobile switch body.

11. The apparatus of claim 10, wherein the inductive switch further comprises a main switch body in magnetic communication with the mobile switch body.

12. The apparatus of claim 11, wherein the mobile switch body and the main switch body are formed of a magnetic material.

13. The apparatus of claim 1, wherein the processor is a radio frequency identification processor.

14. The apparatus of claim 1, wherein the processor is configured to modulate an associated identification number within the carrier wave signal.

15. The apparatus of claim 1, wherein the processor comprises a voltage sensing portion configured to sense a voltage proportional to a load current of the electrical conductor.

16. The apparatus of claim 15, wherein the processor is configured to modulate an associated identification number and proportional voltage value within the carrier signal.

\* \* \* \* \*